Sept. 1, 1931.  H. FORD  1,821,147

COWL MOLDING

Filed Jan. 16, 1930

INVENTOR.
Henry Ford.
BY
E. L. Davis
ATTORNEY.

Patented Sept. 1, 1931

1,821,147

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

COWL MOLDING

Application filed January 16, 1930. Serial No. 421,200.

The object of my invention is to provide a cowl molding of simple, durable, and inexpensive construction.

A further object of my invention is to provide a cowl molding especially adapted for use with the cowl members of motor car bodies, and one which may be easily and securely fastened thereto.

In certain styles of automobile bodies it has been found desirable to secure a highly polished molding to the forward edge of the cowl. This molding usually extends both on the top and sides of the cowl. Heretofore, bolts, screws, or rivets have been used to fasten this molding, but frequently the road and engine vibrations have loosened these fasteners thereby causing the cowl molding to rattle. My improved cowl molding requires the use of no rivets, screws or the like to securely fasten it to the cowl, but rather is secured thereto by placing the molding under tension so that it is urged into contact with each portion of the cowl. It will further be noted that, as this molding is used for ornamental purposes, it is undesirable to use rivets or screws which project through the molding because the heads of the screws or rivets would then be visible and would mar the finished appearance of the device.

Still a further object of my invention is to provide a cowl molding especially adapted for automobile bodies which have a fuel tank formed with the cowl member. When such a fuel tank is thus formed within the cowl member it is not permissible to anchor screws or the like in the walls of the tank as the possible leakage of gasoline through these screw threads would be dangerous. For use with these installations other means must be provided for securing the cowl molding upon this cowl tank. My improved molding requiring no screws or rivets is, therefore, especially suited for this use.

Still a further object of my invention is to provide a cowl molding which may be secured to the cowl member of an automobile in a minimum of time thereby making its use on a quantity production basis desirable. Only one nut is required to be tightened to secure my improved molding to the cowl member which compared to large number of screws ordinarily used results in a great saving in installation time.

With these and other objects in view, my invention consists in the arrangement, construction, and combination of the various parts of my improved device, as described in the specification, claimed in my claims, and illustrated in the accompanying drawings, in which:

Figure 5:
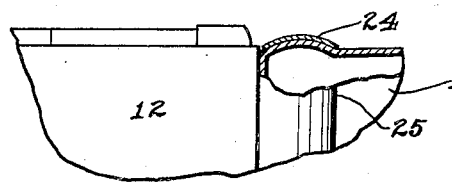
Figure 5 shows a sectional view through the upper center portion of the cowl, illustrating an alternate means for securing a cowl molding thereon.
Figure 1:
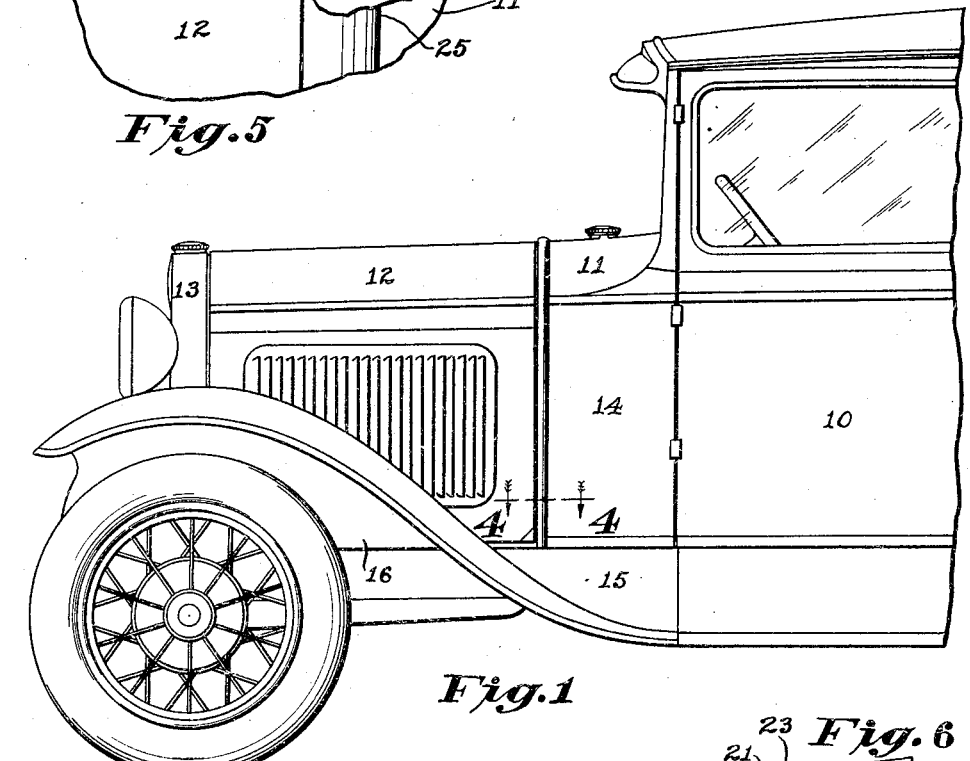
Figure 1 shows a side elevation of the front portion of an automobile having my improved cowl molding installed thereon.
Figure 2:
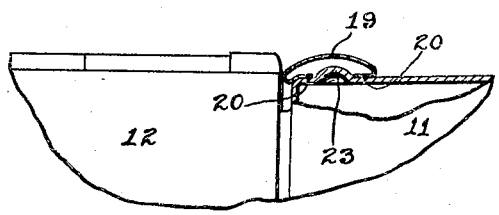
Figure 2 shows a sectional view through the upper center portion of the cowl showing the method of securing the cowl molding thereon.
Figure 6:
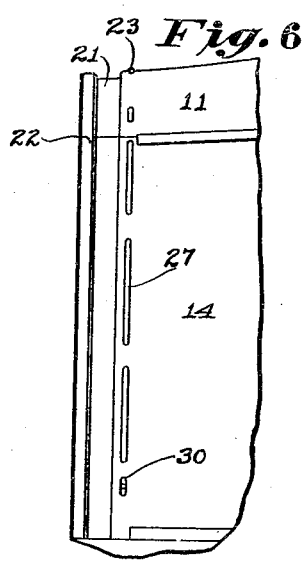
Figure 6 shows a side elevation of the cowl shown in Figure 1, the cowl molding and hood being removed to better illustrate the construction.
Figure 4:
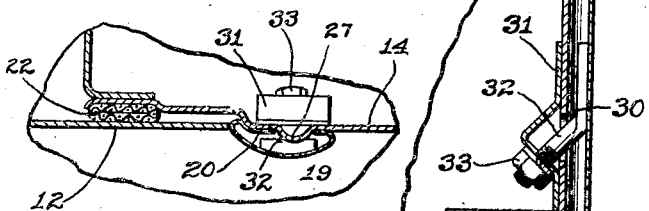
Figure 4 shows a sectional view taken on the line 4—4 of Figure 1.

Referring to the accompanying drawings, I have used the reference numeral 10 to indicate generally the body of an automobile having a cowl member 11, hood 12, and radiator 13. The cowl member 11 extends across the car beneath the windshield and is supported by members 14 on either side. A pair of dust shields 15 are secured to the chassis, the latter being given the general numeral 16.

The cowl member 11 is provided with a compartment forming a fuel tank in the upper portion thereof, the sheet metal of the cowl forming the upper wall of the tank. It will be noted that any screw openings placed in the upper portion of this cowl would extend through into the gasoline tank. A hood pad supporting member 21 is formed integral with the cowl 11 and extends forwardly therefrom where a fabric hood pad 22 is provided against which the rear end of the hood 12 is clamped.

My improved cowl molding consists of a strip of metal highly polished and bent to the shape of the cowl, secured on the forward edge thereof and extending from one dust shield to the other. A section of this molding consists of a convex outer portion 19 having each edge turned back upon itself at 20. The convex portion 19 is usually plated and highly polished so that it will match the radiator and other accessories. A rib 23 is pressed outwardly from the material of the cowl and extends into the space between the edges 20 to prevent lateral movement of the molding. Likewise, a series of vertically disposed ribs 27 are pressed adjacent to the forward edge of each of the cowl supports 14 from the material thereof. These ribs enter the space between the turned in edges 20 of the molding thereby preventing lateral movement of the side sections of this molding.

An alternate method of fastening a cowl molding is shown in Figure 5 where the molding consists of a simple convex strip 24. A similar convex rib 25 is formed on the forward edge of both the cowl and cowl supports so that lateral movement of the strip is prevented.

Figure 3:
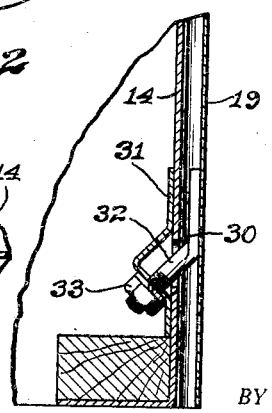
Figure 3 shows a vertical sectional view through one of the cowl supporting members showing the means for fastening the ends of the cowl molding thereto.

Referring to Figure 3, the cowl supporting members 14 are provided with slots 30 placed near the forward edge at the bottom thereof and brackets 31 are welded to the inside of these supports adjacent to the slots. These brackets are perforated to receive adjusting bolts 32 which extend diagonally and inwardly from the inside of the cowl molding. The bolts 32 are preferably secured by spot welding their shanks to the inside of the convex portion 19. Nuts 33 co-act with these bolts and brackets to operatively draw the molding taut around the cowl.

To install my improved cowl molding one of the bolts 32 is anchored in one of the brackets 31 by means of the nut 33 and the bolt on the opposite end of the molding is then tightened in its bracket 31 to draw the molding taut around the cowl. The ribs 23 and 27 co-acting with the top and side portions of the molding, of course, prevents lateral movement thereof at these points.

Among the many advantages arising through the use of my improved device, it may be well to mention that no rivets or screws in the generally accepted sense are used to secure this molding on the cowl. Further, the operations necessary to install my improved molding consists of tightening only two nuts so that a great saving in time results in its installation. Further, the molding is drawn tight around the cowl so that rattle of the device is prevented.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a vehicle, a vehicle chassis having a cowl member mountd thereon, an inverted U-shaped ornamental cowl molding disposed around said cowl, one end of which is anchored thereto adjacent to said chassis, and tensioning means secured to said molding at a point spaced from its other end, said tensioning means extending throgh the cowl in position spaced from the bottom thereof, whereby actuation thereof from above the chassis will draw the molding into engagement with the full periphery of the cowl.

2. In a vehicle, a vehicle chassis having a cowl member mounted thereon, an inverted U-shaped ornamental cowl molding disposed around said cowl, one end of which is anchored thereto adjacent to said chassis, a bolt secured to the inside of said molding at a point spaced from its other end, said bolt extending diagonally downwardly through said cowl in position spaced from the bottom thereof, and a nut for said bolt disposed inside of said cowl, whereby actuation of said nut will draw the molding into engagement with the full periphery of the cowl.

3. In a vehicle, a vehicle chassis having a cowl member mounted thereon, an inverted U-shaped ornamental cowl molding disposed around said cowl, and a pair of tensioning devices secured to said molding at points spaced from the ends thereof, said devices extending inwardly through the cowl at points spaced from the bottom thereof, whereby actuation thereof from above the chassis will draw the molding into engagement with the full periphery of the cowl.

4. In a vehicle, a vehicle chassis having a cowl member mounted thereon, an inverted U-shaped ornamental cowl molding disposed around said cowl, a pair of tensioning bolts secured to the inside of said molding at points spaced from each end thereof, said bolts extending diagonally downwardly and inwardly through said cowl, and a nut threaded on each bolt inside of said cowl whereby the molding is drawn into engagement with the full periphery of the cowl from above the chassis.

January 10, 1930.

HENRY FORD.